US008766967B2

(12) United States Patent
Park et al.

(10) Patent No.: US 8,766,967 B2
(45) Date of Patent: Jul. 1, 2014

(54) METHOD OF DRIVING DISPLAY PANEL AND APPARATUS FOR PERFORMING THE SAME

(75) Inventors: Jae-Hyoung Park, Asan-si (KR); Bong-Ju Jun, Cheonan-si (KR); Yong-Bum Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 469 days.

(21) Appl. No.: 13/209,530

(22) Filed: Aug. 15, 2011

(65) Prior Publication Data

US 2012/0162185 A1 Jun. 28, 2012

(30) Foreign Application Priority Data

Dec. 23, 2010 (KR) ........................ 10-2010-0133638

(51) Int. Cl.
*G06F 3/038* (2013.01)
*G09G 5/00* (2006.01)

(52) U.S. Cl.
USPC .......................................... 345/212; 345/213

(58) Field of Classification Search
USPC .......................................................... 345/212
See application file for complete search history.

(56) References Cited

U.S. PATENT DOCUMENTS

2010/0141636 A1* 6/2010 Marsanne et al. ............ 345/213

* cited by examiner

*Primary Examiner* — Charles V Hicks
(74) *Attorney, Agent, or Firm* — Cantor Colburn LLP

(57) ABSTRACT

A method of driving a display panel includes converting a first data enable signal including a first cycle based on a compensation parameter to generate a second data enable signal including a second cycle longer than the first cycle, generating a plurality of gate signals based on the second data enable signal to output the gate signals to a plurality of gate lines of the display panel, and generating a plurality of data voltages based on the first data enable signal to output the data voltages to a plurality of data lines of the display panel.

20 Claims, 13 Drawing Sheets

METHOD OF DRIVING DISPLAY PANEL AND APPARATUS FOR PERFORMING THE SAME

This application claims priority to Korean Patent Application No. 2010-0133638, filed on Dec. 23, 2010, and all the benefits accruing therefrom under 35 U.S.C. §119, the content of which, in its entirety, is herein incorporated by reference.

BACKGROUND OF THE INVENTION

1. Field of the Invention

Exemplary embodiments of the present invention relate to a method of driving a display panel and a display apparatus for performing the method. More particularly, exemplary embodiments of the present invention relate to a method of driving a display panel while improving a display quality and a display apparatus for performing the method.

2. Description of the Related Art

Generally, a liquid crystal display ("LCD") apparatus includes a display panel displaying an image and a panel driver driving the display panel. The display panel includes a plurality of gate lines, a plurality of data lines and a plurality of pixels connected to the gate lines and the data lines.

The panel driver generates a gate signal and a data voltage. The gate line transmits the gate signal to the pixel and the data line transmits the data voltage to the pixel.

As distance from the panel driver increases, a propagation delay of the gate signal on the gate line may increase. Similarly, as a distance from the panel driver increases, a propagation delay of the data voltage on the data line may also increase.

Hence, when the gate signal is delayed, a turn-on period of a switching element of the pixel decreases and a charging period of the data voltage may also decrease. In addition, when the data voltage is delayed, a level of the data voltage applied to the pixel may decrease as well. As a result, a charging rate of the pixel decreases due to a decrease of the charging period and the level of the data voltage.

Moreover, as a size of the display panel increases, the propagation delays of the gate signal and the data voltage on the gate line and the data line, respectively, increase. In addition, as a driving frequency of the display panel increases, the charging period of the pixel often decreases. Therefore, further decrease of the charging rate of the pixel may thereby cause deterioration of a display quality of the display panel.

BRIEF SUMMARY OF THE INVENTION

Exemplary embodiments of the present invention provide a method of driving a display panel while compensating for a propagation delay of a driving signal to improve a display quality.

Exemplary embodiments of the present invention also provide a display apparatus for performing the above-mentioned method.

In an exemplary embodiment of a method of driving a display panel according to the present invention, the method includes converting a first data enable signal including a first cycle based on a compensation parameter to generate a second data enable signal including a second cycle longer than the first cycle, generating a plurality of gate signals based on the second data enable signal to output the gate signals to a plurality of gate lines of the display panel, and generating a plurality of data voltages based on the first data enable signal to output the data voltages to a plurality of data lines of the display panel.

In an exemplary embodiment, the compensation parameter may include information identifying a compensation gate line, which is required to be compensated among the gate lines. The second data enable signal may include the first cycle corresponding to the gate lines except for the compensation gate line and the second cycle corresponding to the compensation gate line.

In an exemplary embodiment, the first and second data enable signals may each respectively have a high period and a low period. The low period of the second data enable signal corresponding to the compensation gate line may be longer than the low period of the first data enable signal corresponding to the compensation gate line.

In an exemplary embodiment, the low period of the second data enable signal corresponding to the compensation gate line may be longer than the low period of the first data enable signal corresponding to the compensation gate line by one master clock.

In an exemplary embodiment, the high period of the second data enable signal may be substantially the same as the high period of the first data enable signal.

In an exemplary embodiment, the generating a plurality of gate signals may include generating a gate clock signal synchronized with the second data enable signal and generating and outputting the gate signals using the gate clock signal.

In an exemplary embodiment, the gate clock signal may rise after a first period from a rising edge of the second data enable signal, and may fall after a second period from the rising edge of the second data enable signal.

In an exemplary embodiment, the generating a plurality of data voltages may include generating a load signal synchronized with the first data enable signal and generating and outputting the data voltages in response to the load signal.

In an exemplary embodiment, the load signal may rise after a first period from a rising edge of the second data enable signal, and may fall after a second period from the rising edge of the second data enable signal.

In an exemplary embodiment, the data voltages may be synchronized with the load signal.

In an exemplary embodiment, a falling edge of the load signal may be substantially the same as a rising edge of the gate clock signal.

In an exemplary embodiment of a display apparatus according to the present invention, the display apparatus includes a display panel, a timing controller, a first gate driver and a data driver. The display panel includes a plurality of gate lines and a plurality of data lines. The timing controller converts a first data enable signal including a first cycle based on a compensation parameter to generate a second data enable signal including a second cycle longer than the first cycle. The timing controller generates a first control signal based on the second data enable signal and a second control signal based on the first data enable signal. The first gate driver generates a plurality of first gate signals based on the first control signal to respectively output the first gate signals to the gate lines. The data driver generates a plurality of data voltages based on the second control signal to respectively output the data voltages to the data lines.

In an exemplary embodiment, the compensation parameter may include information identifying a compensation gate line, which is required to be compensated among the gate lines. The second data enable signal may include the first cycle corresponding to the gate lines except for the compensation gate line and the second cycle corresponding to the compensation gate line.

In an exemplary embodiment, the first and second data enable signals may each respectively have a high period and a low period. The low period of the second data enable signal corresponding to the compensation gate line may be longer than the low period of the first data enable signal corresponding to the compensation gate line.

In an exemplary embodiment, the low period of the second data enable signal corresponding to the compensation gate line may be longer than the low period of the first data enable signal corresponding to the compensation gate line by one master clock.

In an exemplary embodiment, the high period of the second data enable signal may be substantially the same as the high period of the first data enable signal.

In an exemplary embodiment, the first control signal may include a gate clock signal synchronized with the second data enable signal.

In an exemplary embodiment, the second control signal may include a load signal synchronized with the first data enable signal.

In an exemplary embodiment, a falling edge of the load signal may be substantially the same as a rising edge of the gate clock signal.

In an exemplary embodiment, the display apparatus may further include a second gate driver. The second gate driver may generate a plurality of second gate signals based on the first control signal to respectively output the second gate signals to the gate lines. The second gate driver may be disposed on a side opposite to the first gate driver with respect to the display panel.

According to an exemplary embodiment of a method of driving a display panel and an exemplary embodiment of a display apparatus for performing the method, a propagation delay of a data voltage is compensated so that a charging rate of a pixel may be increased. Thus, a display quality of the display panel may be improved.

BRIEF DESCRIPTION OF THE DRAWINGS

The above and other features, aspects and advantages of this disclosure will become more apparent by describing in further detail exemplary embodiments thereof with reference to the accompanying drawings, in which.

DETAILED DESCRIPTION OF THE INVENTION

Figure 1:
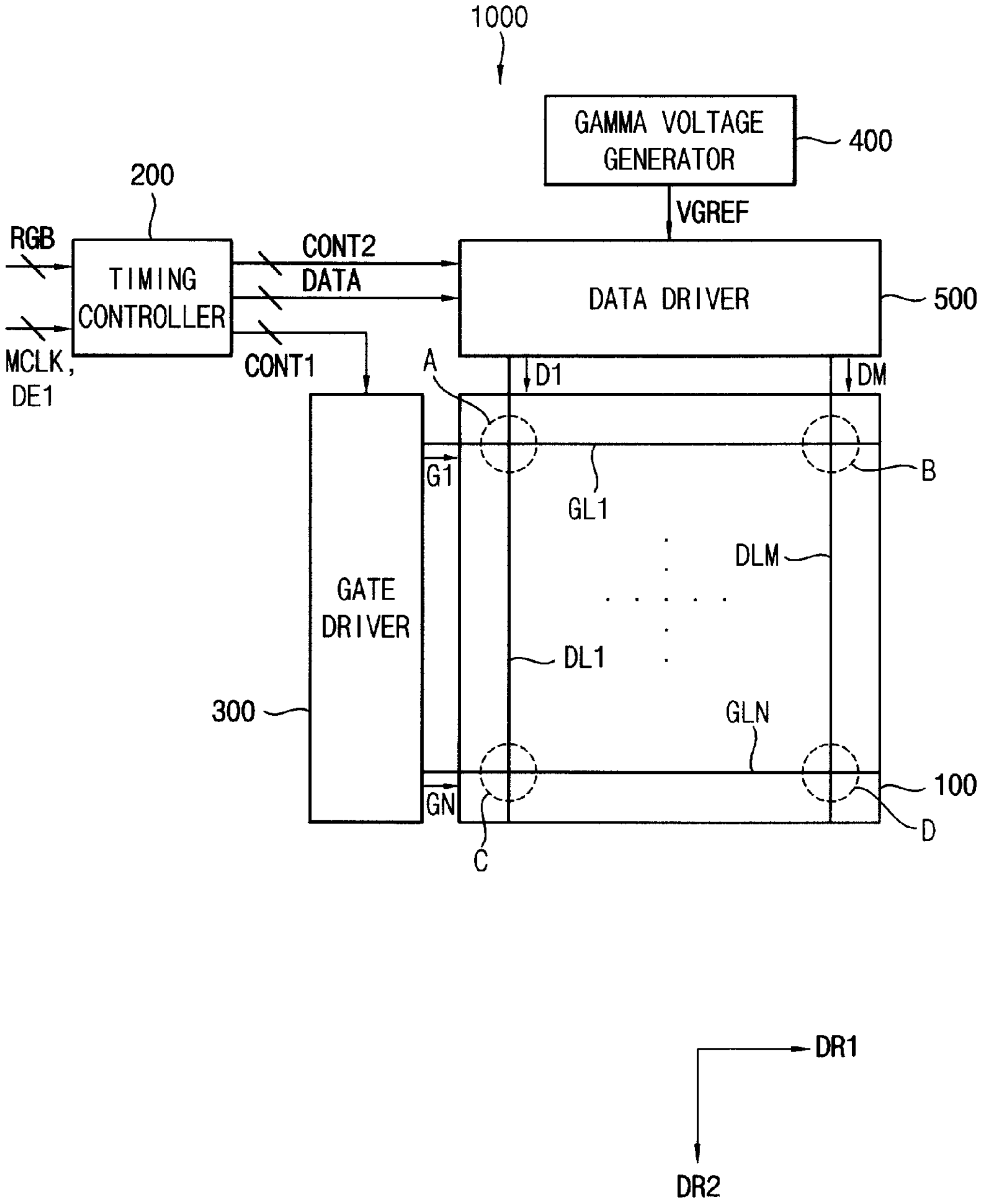
FIG. 1 is a block diagram illustrating an exemplary embodiment of a display apparatus according to the present invention.

The invention now will be described more fully hereinafter with reference to the accompanying drawings, in which various embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section.

Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

FIG. 1 is a block diagram illustrating an exemplary embodiment of a display apparatus according to the present invention.

Referring to FIG. 1, the display apparatus 1000 includes a display panel 100, a timing controller 200, a gate driver 300, a gamma voltage generator 400 and a data driver 500.

The display panel 100 includes a plurality of gate lines GL1 to GLN, a plurality of data lines DL1 to DLM and a plurality of pixels electrically connected to the gate lines GL1 to GLN and the data lines DL1 to DLM. Herein N and M are natural numbers. The gate lines GL1 to GLN extend in a first direction DR1 and the data lines DL1 to DLM extend in a second direction DR2 crossing the first direction DR1. Each pixel includes a switching element, a liquid crystal capacitor and a storage capacitor. The liquid crystal capacitor and the storage capacitor are electrically connected to the switching element. The pixels are arranged in a matrix form.

In an exemplary embodiment, when a resolution of the display apparatus 1000 is 1920×1080 pixels, M may be 1920, N may be 1080 and the number of pixels is 2,073,600. According to an arrangement direction of the pixels, M may be 1920×3 or N may be 1080×3.

The timing controller 200 receives an input image data and an input control signal from an external apparatus. The input image data may include a red image data R, a green image data G and a blue image data B. The input control signal includes a master clock signal MCLK and a first data enable signal DE1. The input control signal may further include a vertical synchronizing signal and a horizontal synchronizing signal.

The timing controller 200 generates a first control signal CONT1, a second control signal CONT2 and a data signal DATA based on the input image data and the input control signal. The timing controller 200 generates the first control signal CONT1 for controlling a driving timing of the gate driver 300 based on the input control signal and outputs the first control signal CONT1 to the gate driver 300. The timing controller 200 generates the second control signal CONT2 for controlling a driving timing of the data driver 500 based on the input control signal and outputs the second control signal CONT2 to the data driver 500. An operation of the timing controller 200 is explained in detail referring to FIG. 2.

The first control signal CONT1 includes a vertical start signal and a gate clock signal. The second control signal CONT2 includes a horizontal start signal and a load signal.

The gate driver 300 generates gate signals G1 to GN driving the gate lines GL1 to GLN in response to the first control signal CONT1 received from the timing controller 200. The gate driver 300 sequentially outputs the gate signals G1 to GN to the gate lines GL1 to GLN.

The gate driver 300 may be directly mounted on the display panel 100. In an exemplary embodiment, the gate driver 300 may be connected to the display panel 100 as a tape carrier package ("TCP") type. Alternatively, the gate driver 300 may be integrated on the display panel 100.

The gamma voltage generator 400 generates a gamma reference voltage VGREF. The gamma voltage generator 400 provides the gamma reference voltage VGREF to the data driver 500. The gamma reference voltage VGREF has a value that corresponds to a level of the data signal DATA. The gamma voltage generator 400 may be disposed in the timing controller 200 or in the data driver 500.

The data driver 500 receives the second control signal CONT2 and the data signal DATA from the timing controller 200 and receives the gamma reference voltages VGREF from the gamma voltage generator 400. The data driver 500 converts the data signal DATA into data voltages D1 to DM having an analog type using the gamma reference voltages VGREF. The data driver 500 sequentially outputs the data voltages D1 to DM to the data lines DL1 to DLM.

The data driver 500 may include a shift register, a latch, a signal processor and a buffer. The shift register outputs a latch pulse to the latch. The latch temporarily stores the data signal DATA and outputs the data signal DATA. The signal processor generates the data voltages D1 to DM having an analog type based on the data signal DATA having a digital type and the gamma reference voltages VGREF to output the data voltages D1 to DM to the buffer. The buffer compensates the data voltages D1 to DM to have a uniform level and outputs the data voltages D1 to DM to the data lines DL1 to DLM.

The data driver 500 may be directly mounted on the display panel 100. In an exemplary embodiment, the data driver 500 may be connected to the display panel 100 as a TCP type. Alternatively, the data driver 500 may be integrated on the display panel 100.

Figure 2:
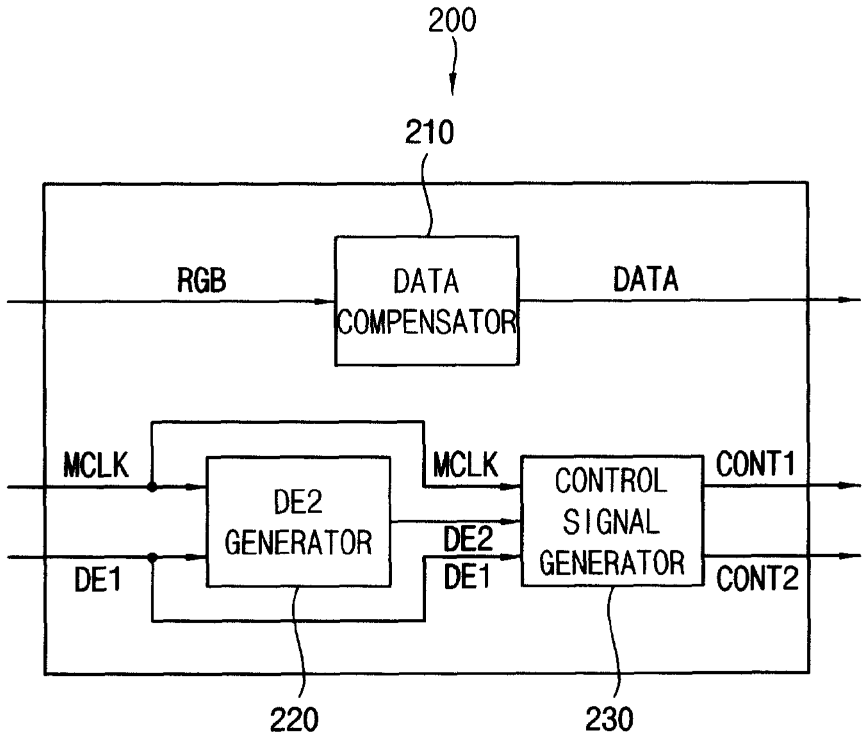
FIG. 2 is a block diagram illustrating an exemplary embodiment of a timing controller of FIG. 1.

FIG. 2 is a block diagram illustrating an exemplary embodiment of the timing controller 200 of FIG. 1.

Referring to FIG. 2, the timing controller 200 includes a data compensator 210, a second data enable signal generator 220 and a control signal generator 230. The timing controller 200 is not physically divided into the blocks 210, 220 and 230. Rather, the timing controller 200 is logically divided into the blocks 210, 220 and 230 for convenience of explanation.

The data compensator 210 receives the input image data RGB from an external apparatus. The data compensator 210 compensates the input image data RGB to generate the data signal DATA. The data compensator 210 outputs the data signal DATA to the data driver 500.

The data compensator 210 may include a color characteristic compensating part and a dynamic capacitance compensating part.

The color characteristic compensating part receives the input image data RGB and performs an adaptive color correction ("ACC"). The color characteristic compensating part may compensate the input image data RGB using a gamma curve.

The dynamic capacitance compensating part performs a dynamic capacitance compensation ("DCC") to compensate present frame data using previous frame data and the present frame data.

The second data enable signal generator 220 receives the master clock signal MCLK and the first data enable signal DE1 from an external apparatus. The second data enable signal generator 220 generates a second data enable signal DE2 based on the master clock signal MCLK, the first data enable signal DE1 and a compensation parameter. The second data enable signal generator 220 outputs the second data enable signal DE2 to the control signal generator 230. An operation of the second data enable signal generator 220 is explained in further detail in FIG. 5.

The timing controller 200 may further include a memory. The memory may store data required for operation of the color characteristic compensating part, the dynamic capacitance compensating part and the second data enable signal generator. The memory may be positioned in the timing controller 200. Alternatively, the memory may be positioned external to the timing controller 200.

The control signal generator 230 receives the master clock signal MCLK and the first data enable signal DE1 from an external apparatus and receives the second data enable signal DE2 from the second data enable signal generator 220.

The control signal generator 230 generates the first control signal CONT1 based on the master clock signal MCLK and the second data enable signal DE2 to output the first control signal CONT1 to the gate driver 300. The control signal generator 230 generates the second control signal CONT2 based on the master clock signal MCLK and the first data enable signal DE1 to output the second control signal CONT2 to the data driver 500. An operation of the control signal generator 230 is explained in detail referring to FIGS. 3 and 5.

Figure 3:
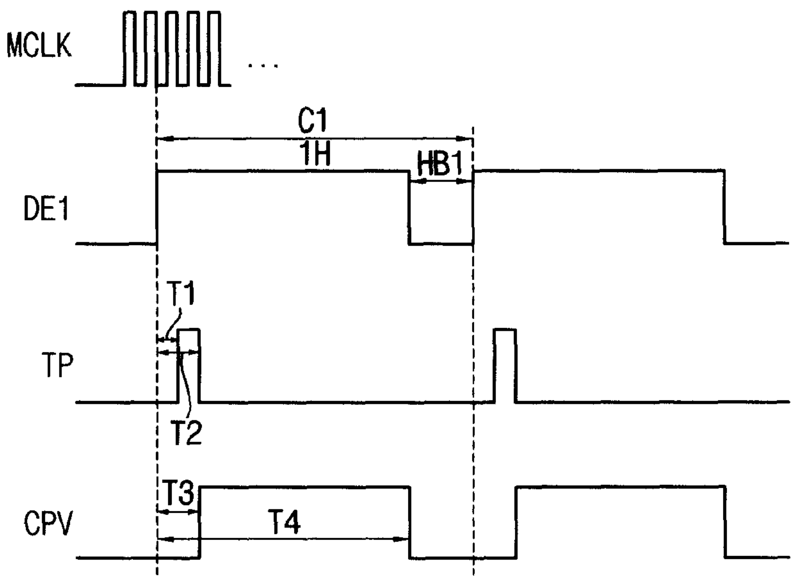
FIG. 3 is a waveform diagram illustrating driving signals of a display apparatus not including a second data enable signal generator.

FIG. 3 is a waveform diagram illustrating driving signals of a display apparatus not including a second data enable signal generator.

Referring to FIGS. 2 and 3, the control signal generator 230 receives the master clock signal MCLK and the first data enable signal DE1 from an external apparatus.

The master clock signal MCLK includes pulse waves repeated in a relatively short cycle. The master clock signal MCLK is called a pixel clock signal. A single pulse of the master clock signal MCLK corresponds to grayscale data of a single pixel.

The first data enable signal DE1 includes square waves repeated in a first cycle C1. The first cycle C1 may be a single horizontal cycle 1H in which data voltages are applied to pixels corresponding to a single gate line.

The first data enable signal DE1 includes a high period representing a high value and a low period HB1 representing a low value. Input data are enabled in the high period, but input data are disabled in the low period HB1. The low period HB1 is called as a horizontal black period.

For example, when a resolution of the display apparatus is 1920×1080 pixels, the high period of the first data enable signal DE1 corresponds to 1920 master clocks. As explained above, the high period of the first data enable signal DE1 corresponds to 1920×3 master clocks according to the arrangement direction of the pixels. The low period may be varied. For example, the low period corresponds to 180 master clocks. Then, the first cycle C1 may corresponds to 2100 master clocks, which are a sum of the high and low periods. For example, when a driving frequency of the display apparatus is 60 hertz (Hz), the first horizontal period 1H is 1/60/2100. The first horizontal period 1H may be about 7.94 microseconds (μs). Thus, the first cycle C1 may be about 7.94 μs.

The input image data RGB may be inputted into the timing controller 200 through a plurality of channels. When a resolution of the display apparatus is 1920×1080 pixels and the input image data RGB is inputted through two channels, then, per channel, the high period of the first data enable signal DE1 corresponds to 960 master clocks (1920/2). The low period corresponds to 90 master clocks (180/2). Then, the first cycle C1, per channel, may corresponds to 1050 master clocks, which are a sum of the high and low periods.

A first square wave of the first data enable signal DE1 corresponds to a first gate line GL1, a second square wave of the first data enable signal DE1 corresponds to a second gate line GL2 and a N-th square wave of the first data enable signal DE1 corresponds to a N-th gate line GLN.

For example, when a resolution of the display apparatus is 1920×1080 pixels, the first data enable signal DE1 includes 1080 square waves corresponding to 1 frame period. As explained above, the first data enable signal DE1 includes 1080×3 square waves corresponding to 1 frame period according to the arrangement direction of the pixels.

The control signal generator 230 generates a load signal TP and a gate clock signal CPV based on the master clock signal MCLK and the first data enable signal DE1.

The load signal TP includes square waves repeated in a predetermined cycle.

The load signal TP may be synchronized with the first data enable signal DE1. Thus, the cycle of the load signal TP may be equal to the first cycle C1.

For example, the load signal TP rises after a first period T1 from a rising edge of the first data enable signal DE1 and falls after a second period T2 from the rising edge of the first data enable signal DE1. The second period T2 is longer than the first period T1. For example, the load signal TP may maintain a high value in 10 master clocks.

The control signal generator 230 outputs the load signal TP to the data driver 500.

The gate clock signal CPV includes square waves repeated in a predetermined cycle.

The gate clock signal CPV may be synchronized with the first data enable signal DE1. Thus, the cycle of the gate clock signal CPV may be equal to the first cycle C1.

For example, the gate clock signal CPV rises after a third period T3 from the rising edge of the first data enable signal DE1 and falls after a fourth period T4 from the rising edge of the first data enable signal DE1. The fourth period T4 is longer than the third period T3.

A high period of the gate clock signal CPV may be properly adjusted considering a charging rate of the pixel and a data error of the pixel due to a propagation delay on the gate line. For example, the high period of the gate clock signal CPV may be adjusted to have a length of about 50 percent (%) to about 80% of the first cycle C1.

The control signal generator 230 outputs the gate clock signal CPV to the gate driver 300.

Figure 4A:
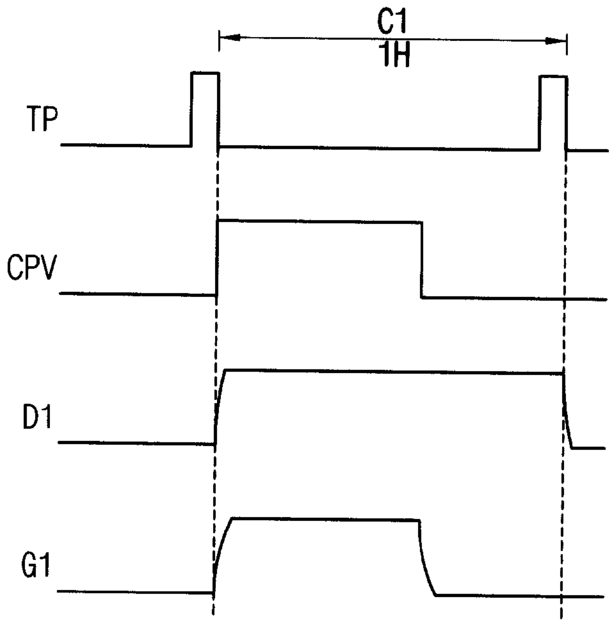
FIG. 4A is a waveform diagram illustrating driving signals applied to pixel A of FIG. 1 in the display apparatus not including the second data enable signal generator.

FIG. 4A is a waveform diagram illustrating driving signals applied to pixel A of FIG. 1 in the display apparatus not including the second data enable signal generator 220.

Figure 4B:
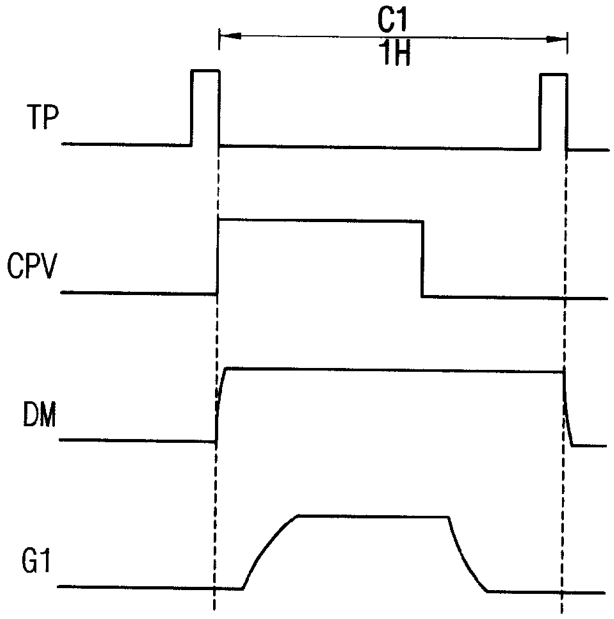
FIG. 4B is a waveform diagram illustrating driving signals applied to pixel B of FIG. 1 in the display apparatus not including the second data enable signal generator.

FIG. 4B is a waveform diagram illustrating driving signals applied to pixel B of FIG. 1 in the display apparatus not including the second data enable signal generator 220.

Figure 4C:
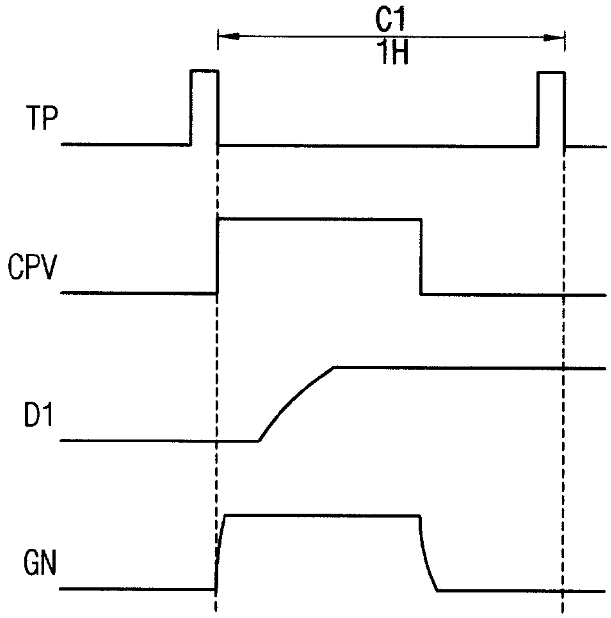
FIG. 4C is a waveform diagram illustrating driving signals applied to pixel C of FIG. 1 in the display apparatus not including the second data enable signal generator.

FIG. 4C is a waveform diagram illustrating driving signals applied to pixel C of FIG. 1 in the display apparatus not including the second data enable signal generator 220.

Figure 4D:
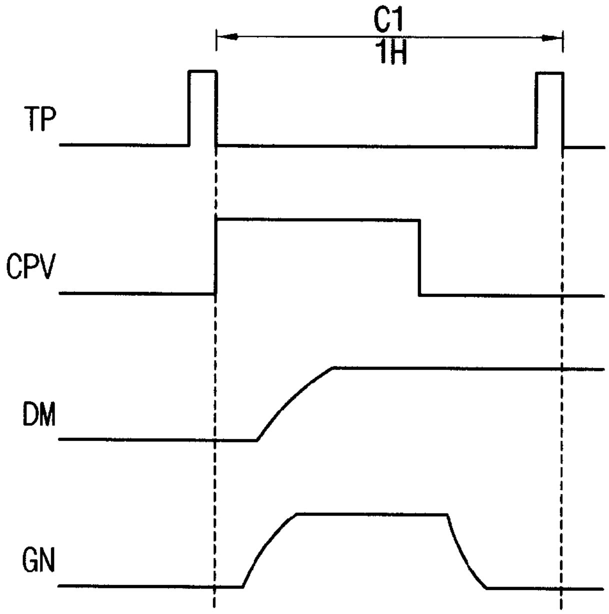
FIG. 4D is a waveform diagram illustrating driving signals applied to pixel D of FIG. 1 in the display apparatus not including the second data enable signal generator.

FIG. 4D is a waveform diagram illustrating driving signals applied to pixel D of FIG. 1 in the display apparatus not including the second data enable signal generator 220.

Referring to FIGS. 1 and 4A to 4D, the data driver 500 receives the load signal TP and the data signal DATA from the timing controller 200 and receives the gamma reference voltages VGREF from the gamma voltage generator 400 to generate the data voltages D1 to DM.

The data driver 500 generates the data voltages D1 to DM in response to the load signal TP. The data voltages D1 and DM may be synchronized with the load signal TP. For example, the data voltages D1 and DM are synchronized with a falling edge of the load signal TP.

The data voltages D1 to DM may be continuously provided. For example, the first data voltage D1 is outputted corresponding to a first falling edge of the load signal TP and the second data voltage D2 may be continuously outputted corresponding to a second falling edge of the load signal without a blank period.

The gate driver 300 generates the gate signals G1 and GN in response to the gate clock signal CPV. The gate signals G1 and GN may be synchronized with the gate clock signal CPV. For example, the gate signals G1 and GN rise at a rising edge of the gate clock signal CPV and fall at a falling edge of the gate clock signal CPV.

When the gate signals G1 and GN increase over a predetermined value, the switching elements of the pixels connected to the gate lines GL1 and GLN are turned on. The switching elements are turned on by the gate signals G1 and GN so that the pixels charge the data voltages D1 and DM.

When a distance from the data driver 500 increases, a propagation delay of the data voltages D1 and DM on the data lines DL1 and DLM may be occurred. When a distance from the gate driver 300 increases, a propagation delay of the gate signals G1 and GN on the gate lines GL1 and GLN may be occurred.

Referring to FIG. 1, a pixel A is connected to a first gate line GL1 and a first data line DL1, a pixel B is connected to the first gate line GL1 and a M-th data line DLM, a pixel C is connected to a N-th gate line GLN and the first data line DL1 and a pixel D is connected to the N-th gate line GLN and the M-th data line DLM.

Referring to FIGS. 1 and 4A, a propagation delay of a first gate signal G1 applied to a pixel corresponding to the pixel A through the first gate line GL1 is rarely occurred because a distance between the gate driver 300 and the pixel is relatively short. In addition, a propagation delay of a first data voltage D1 applied to the pixel corresponding to the pixel A through the first data line DL1 is rarely occurred because a distance between the data driver 500 and the pixel is relatively short.

The load signal TP and the gate clock signal CPV respectively include square waves repeated in a single horizontal period 1H.

The load signal TP is synchronized with the first data enable signal DE1 and the gate clock signal CPV is synchronized with the first data enable signal DE1 so that the gate clock signal CPV is synchronized with the load signal TP. The gate clock signal CPV rises at a falling edge of the load signal TP.

The data voltages D1 to DM are generated in response to the load signal TP. The data voltages D1 to DM may be synchronized with the load signal TP.

The first data voltage D1 is synchronized with a first square wave of the load signal TP. The first data voltage D1 rises at a first falling edge of the load signal TP and maintains a high level for a single horizontal cycle 1H.

The gate signals G1 to GN are generated in response to the gate clock signal CPV. The gate signals G1 to GN may be synchronized with the gate clock signal CPV.

The first gate signal G1 is synchronized with a first square wave of the gate clock signal CPV. The first gate signal G1 rises at a first rising edge of the gate clock signal CPV and falls at a first falling edge of the gate clock signal CPV.

As shown in FIG. 4A, the first gate signal G1 applied to the pixel corresponding to the pixel A is rarely delayed so that a charging period is relatively long. The first data voltage D1 applied to the pixel corresponding to the pixel A is rarely delayed so that a relatively high data voltage is provided to the pixel. As a result, a charging rate of the first data voltage D1 applied to the pixel corresponding to the pixel A is relatively high.

Referring to FIGS. 1 and 4B, a propagation delay of a first gate signal G1 applied to a pixel corresponding to the pixel B through the first gate line GL1 may be occurred because a distance between the gate driver 300 and the pixel is relatively long. In contrast, a propagation delay of a M-th data voltage DM applied to the pixel corresponding to the pixel B through the M-th data line DLM is rarely occurred because a distance between the data driver 500 and the pixel is relatively short.

The load signal TP and the gate clock signal CPV respectively include square waves repeated in a single horizontal period 1H. The gate clock signal CPV is synchronized with the load signal TP.

The M-th data voltage DM is synchronized with a M-th square wave of the load signal TP. The M-th data voltage DM rises at a M-th falling edge of the load signal TP, and maintains a high level for a single horizontal cycle 1H.

The first gate signal G1 is synchronized with a first square wave of the gate clock signal CPV. The first gate signal G1 rises at a first rising edge of the gate clock signal CPV and falls at a first falling edge of the gate clock signal CPV. The first gate signal G1 may be delayed.

As shown in FIG. 4B, the first gate signal G1 applied to the pixel corresponding to the pixel B is delayed so that a turn-on period of the switching element of the pixel is decreased. Thus, a charging period of the pixel may be decreased. In contrast, the M-th data voltage DM applied to the pixel corresponding to the pixel B is rarely delayed so that a relatively high data voltage is provided to the pixel. As a result, a charging rate of the M-th data voltage DM applied to the pixel corresponding to the pixel B may be lower than the charging rate of the first data voltage D1 applied to the pixel corresponding to the pixel A.

Referring to FIGS. 1 and 4C, a propagation delay of a N-th first gate signal GN applied to a pixel corresponding to the pixel C through the N-th gate line GLN is rarely occurred because a distance between the gate driver 300 and the pixel is relatively short. In contrast, a propagation delay of a first data voltage D1 applied to the pixel corresponding to the pixel C may be occurred because a distance between the data driver 500 and the pixel is relatively long.

The load signal TP and the gate clock signal CPV respectively include square waves repeated in a single horizontal period 1H. The gate clock signal CPV is synchronized with the load signal TP.

The first data voltage D1 is synchronized with a first square wave of the load signal TP. The first data voltage D1 rises at a first falling edge of the load signal TP and maintains a high level for a single horizontal cycle 1H. The first data voltage D1 may be delayed.

The N-th gate signal GN is synchronized with a N-th square wave of the gate clock signal CPV. The N-th gate signal GN rises at a N-th rising edge of the gate clock signal CPV and falls at a N-th falling edge of the gate clock signal CPV.

As shown in FIG. 4C, the n-th gate signal GN applied to the pixel corresponding to the pixel C is rarely delayed so that a charging period is relatively long. In contrast, the first data voltage D1 applied to the pixel corresponding to the pixel C is delayed so that a relatively low data voltage is provided to the pixel. As a result, a charging rate of the first data voltage D1 applied to the pixel corresponding to the pixel C may be lower than the charging rate of the first data voltage D1 applied to the pixel corresponding to the pixel A. In addition, a turn-on timing of the switching element according to the gate signal GN does not match an applying timing of the first data voltage D1 so that the charging rate of the first data voltage D1 may be further decreased.

Referring to FIGS. 1 and 4D, a propagation delay of a N-th first gate signal GN applied to a pixel corresponding to the pixel D through the N-th gate line GLN is occurred because a distance between the gate driver 300 and the pixel is relatively long. In addition, a propagation delay of a M-th data voltage DM applied to the pixel corresponding to the pixel D may be occurred because a distance between the data driver 500 and the pixel is relatively long.

The load signal TP and the gate clock signal CPV respectively include square waves repeated in a single horizontal period 1H. The gate clock signal CPV is synchronized with the load signal TP.

The M-th data voltage DM is synchronized with a first square wave of the load signal TP. The M-th data voltage DM rises at a first falling edge of the load signal TP, and maintains a high level for a single horizontal cycle 1H. The M-th data voltage DM may be delayed.

The N-th gate signal GN is synchronized with a N-th square wave of the gate clock signal CPV. The N-th gate signal GN rises at a N-th rising edge of the gate clock signal CPV and falls at a N-th falling edge of the gate clock signal CPV. The N-th gate signal GN may be delayed.

As shown in FIG. 4D, the n-th gate signal GN applied to the pixel corresponding to the pixel D is delayed so that a turn-on period of the switching element of the pixel is decreased. Thus, a charging period of the pixel may be decreased. In addition, the M-th data voltage DM applied to the pixel corresponding to the pixel D is delayed so that a relatively low data voltage is provided to the pixel. As a result, a charging rate of the M-th data voltage DM applied to the pixel corresponding to the pixel D may be lower than the charging rate of the M-th data voltage DM applied to the pixel corresponding to the pixel B.

In FIGS. 4B and 4D, the charging rate of the pixel may be decreased due to a gate propagation delay and in FIGS. 4C and 4D, the charging rate of the pixel may be decreased due to a data propagation delay. A decrease of the charging rate due to the data propagation delay may be greater than a decrease of the charging rate due to the gate propagation delay so that data propagation delay compensation may be required.

Figure 5:
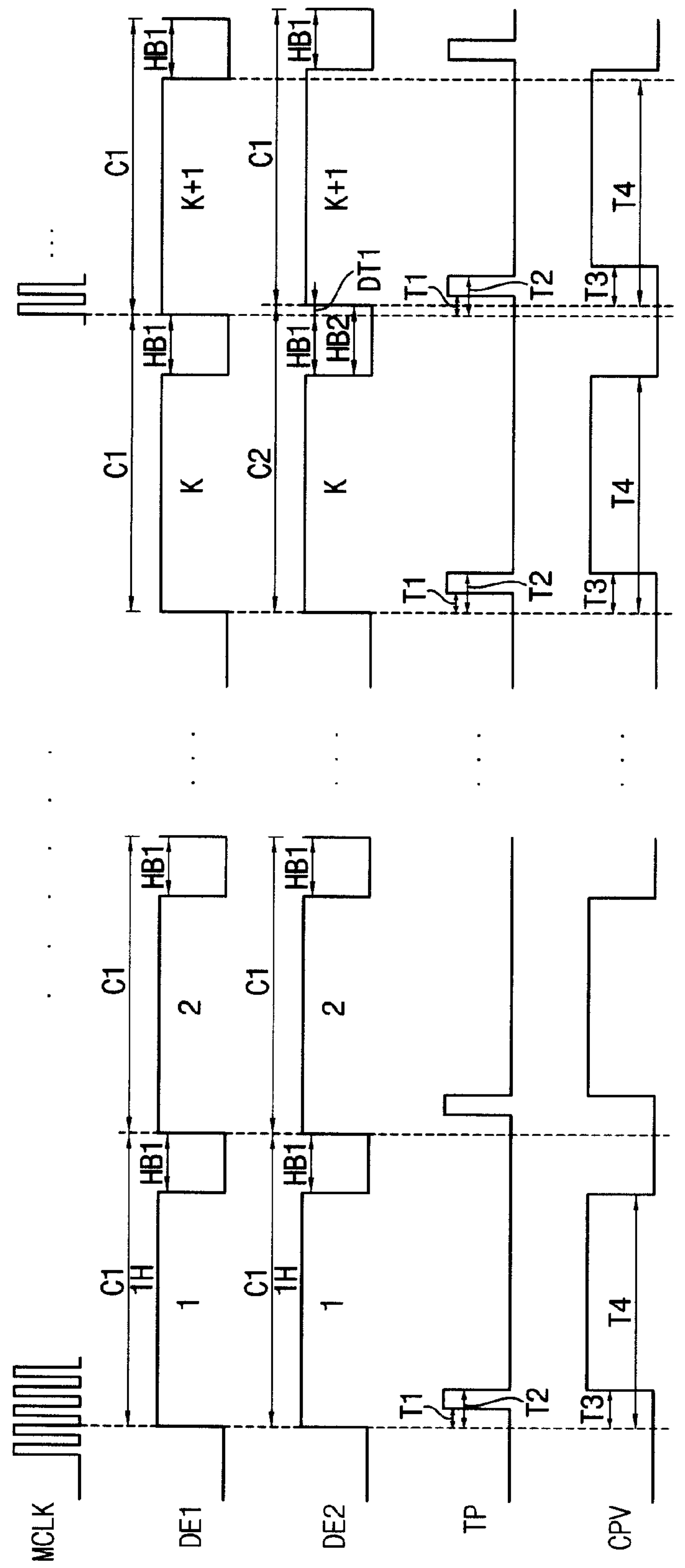
FIG. 5 is a waveform diagram illustrating an exemplary embodiment of driving signals of a display apparatus of FIG. 1.

FIG. 5 is a waveform diagram illustrating an exemplary embodiment of driving signals of a display apparatus of FIG. 1.

Referring to FIGS. 2 and 5, the second data enable signal generator 220 receives the master clock signal MCLK and the first data enable signal DE1 from an external apparatus.

The master clock signal MCLK includes pulse waves repeated in a relatively short cycle. A single pulse of the master clock signal MCLK corresponds to grayscale data of a single pixel.

The first data enable signal DE1 includes square waves repeated in a first cycle C1. The first cycle C1 may be a single horizontal cycle 1H. The first data enable signal DE1 includes a high period representing a high value and a low period HB1 representing a low value.

The master clock signal MCLK and the first data enable signal DE1 in FIG. 5 are substantially the same as the master clock signal MCLK and the first data enable signal DE1 in FIG. 3 so that any repetitive explanation concerning the above elements will be omitted.

The second data enable signal generator 220 converts the first data enable signal DE1 based on a compensation parameter to generate the second data enable signal DE2.

The compensation parameter includes information identifying a compensation gate line, which is required to be compensated among the gate lines.

The second data enable signal DE2 has the first cycle C1 and a second cycle C2 longer than the first cycle C1. The second data enable signal DE2 has the second cycle C2 corresponding to the compensation gate line and has the first cycle C1 corresponding to the gate lines except for the compensation gate line.

The second data enable signal DE2 may be generated by extending the low period HB1 of the first data enable signal DE1 for a first delay period DT1 corresponding to the compensation gate line.

The first delay period DT1 may be synchronized with the master clock signal MCLK. In an exemplary embodiment, the first delay period DT1 may be equal to 1 master clock.

In FIG. 5, the compensation gate line is a K-th gate line. Thus, the second data enable signal DE2 has the second cycle C2 longer than the first cycle C1 corresponding to the K-th gate line.

The second data enable signal DE2 is generated by extending the low period HB1 of a K-th wave of the first data enable signal DE1 for the first delay period DT1. Therefore, a low period HB2 of the second data enable signal DE2 corresponding to the K-th gate line is longer than the low period HB1 of the first data enable signal DE1.

The gate clock signal CPV is synchronized with the second data enable signal DE2 and the gate signals G1 to GN are synchronized with the gate clock signal CPV.

When the second data enable signal DE2 corresponding to the K-th gate line is adjusted to have the second cycle C2 longer than the first cycle C1 for the first delay period DT1, a rising edge of a square wave of the gate clock signal CPV corresponding to the (K+1)-th gate line is delayed for the first delay period DT1. Accordingly, a rising timing of the (K+1)-th gate signal is delayed. As explained above, a decrease of the charging rate of the pixel due to the data propagation delay may be compensated by setting the compensation gate line.

Hereinafter, the compensation parameter may be explained in detail.

The compensation parameter includes information identifying a compensation gate line among the gate lines. The compensation parameter may represent a plurality of compensation gate lines. The maximum number of the compensation gate lines may be predetermined considering the maximum data propagation delay on the display panel 100.

The compensation parameter may be stored in a lookup table. The lookup table may be stored in the memory disposed in the second data enable signal generator 220. Alternatively, the memory may be disposed external to the second data enable signal generator 220.

Table 1 illustrates a first lookup table storing a compensation parameter.

TABLE 1

| Step | Compensation gate line |
|---|---|
| 1 | 3 |
| 2 | 10 |
| 3 | 50 |
| . . . | . . . |
| 100 | 1500 |

In Table 1, the lookup table includes 100 steps so that the number of the compensation gate lines may be set within 100. In an exemplary embodiment, the lookup table includes 100 compensation gate lines.

In a first step, the compensation gate line is 3, so that the second data enable signal DE2 has the second cycle C2 longer than the first cycle C1 for the first delay period DT1 corresponding to a third gate line. Thus, the gate signal is delayed for the first delay period DT1 from a fourth gate line.

In a second step, the compensation gate line is 10, so that the second data enable signal DE2 has the second cycle C2 longer than the first cycle C1 for the first delay period DT1 corresponding to a tenth gate line. Thus, the gate signal is further delayed for the first delay period DT1 from an eleventh gate line.

In a third step, the compensation gate line is 50, so that the second data enable signal DE2 has the second cycle C2 longer than the first cycle C1 for the first delay period DT1 corresponding to a 50th gate line. Thus, the gate signal is further delayed for the first delay period DT1 from a 51st gate line.

Finally, the N-th gate signal may be delayed for 100 first delay periods DT1.

Table 2 illustrates a second lookup table storing a compensation parameter.

TABLE 2

| Step | Compensation gate line |
|---|---|
| 1 | 200 |
| 2 | 600 |
| 3 | 1000 |
| 4 | 2000 |
| 5 | 2000 |
| . . . | . . . |
| 100 | 2000 |

In Table 2, the lookup table includes 100 steps so that the number of the compensation gate lines may be set within 100. In an exemplary embodiment, the number of the compensation gate lines may be set less than 10 according to an amount of the data propagation delay.

When a resolution of the display apparatus 1000 is 1920×1080 pixels, the number of the gate lines may be 1080. When a value of the compensation gate line in the lookup table is set to exceed the number of the gate lines, a cycle of the second data enable signal DE2 may not be changed in that step.

In a first step, the compensation gate line is 200, so that the second data enable signal DE2 has the second cycle C2 longer than the first cycle C1 for the first delay period DT1 corresponding to a 200th gate line. Thus, the gate signal is delayed for the first delay period DT1 from a 201st gate line.

In a second step, the compensation gate line is 600, so that the second data enable signal DE2 has the second cycle C2 longer than the first cycle C1 for the first delay period DT1 corresponding to a 600th gate line. Thus, the gate signal is further delayed for the first delay period DT1 from a 601st gate line.

In a third step, the compensation gate line is 1000, so that the second data enable signal DE2 has the second cycle C2 longer than the first cycle C1 for the first delay period DT1 corresponding to a 1000th gate line. Thus, the gate signal is further delayed for the first delay period DT1 from 1001st gate line.

However, in fourth to 100th steps, the compensation gate line is 2000 exceeding the number of the gate lines 1080, so that the cycle of the second data enable signal DE2 is not changed in fourth to 100th steps.

Finally, the N-th gate signal may be delayed for 3 first delay periods DT1.

Figure 6A:
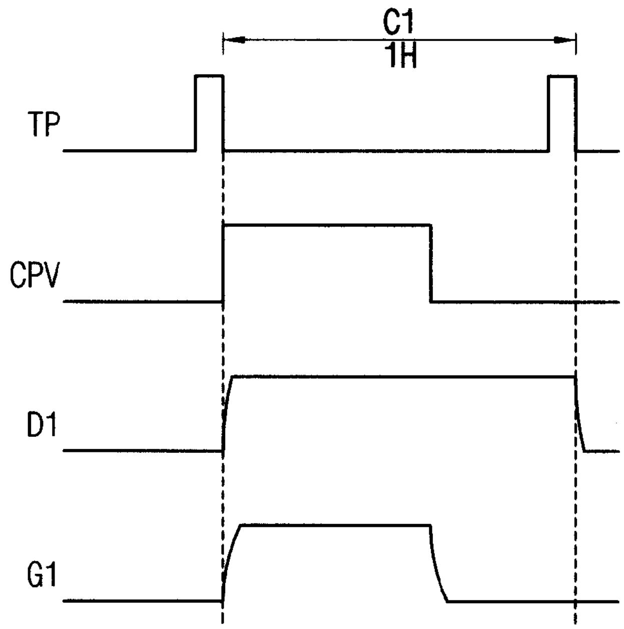
FIG. 6A is a waveform diagram illustrating an exemplary embodiment of driving signals applied to pixel A of FIG. 1.

FIG. 6A is a waveform diagram illustrating an exemplary embodiment of driving signals applied to pixel A of FIG. 1.

Figure 6B:
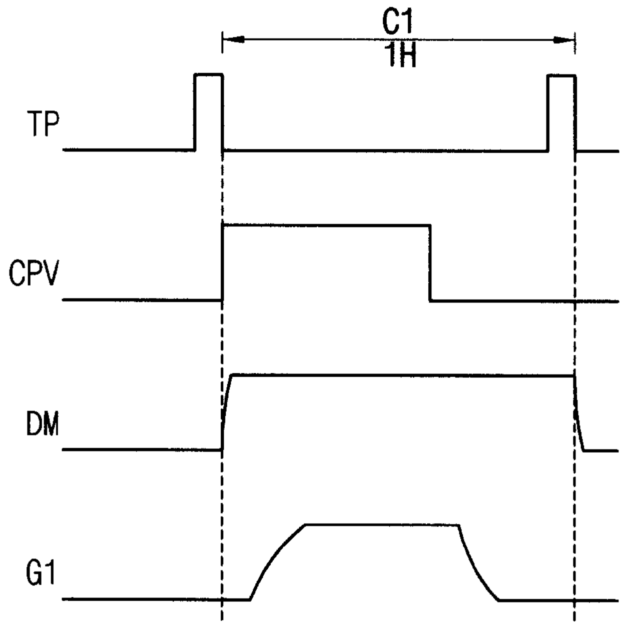
FIG. 6B is a waveform diagram illustrating an exemplary embodiment of driving signals applied to pixel B of FIG. 1.

FIG. 6B is a waveform diagram illustrating an exemplary embodiment of driving signals applied to pixel B of FIG. 1.

Figure 6C:
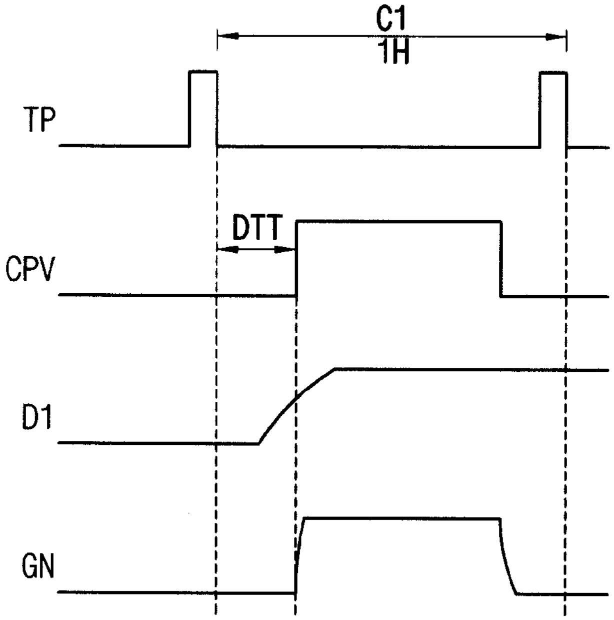
FIG. 6C is a waveform diagram illustrating an exemplary embodiment of driving signals applied to pixel C of FIG. 1.

FIG. 6C is a waveform diagram illustrating an exemplary embodiment of driving signals applied to pixel C of FIG. 1.

Figure 6D:
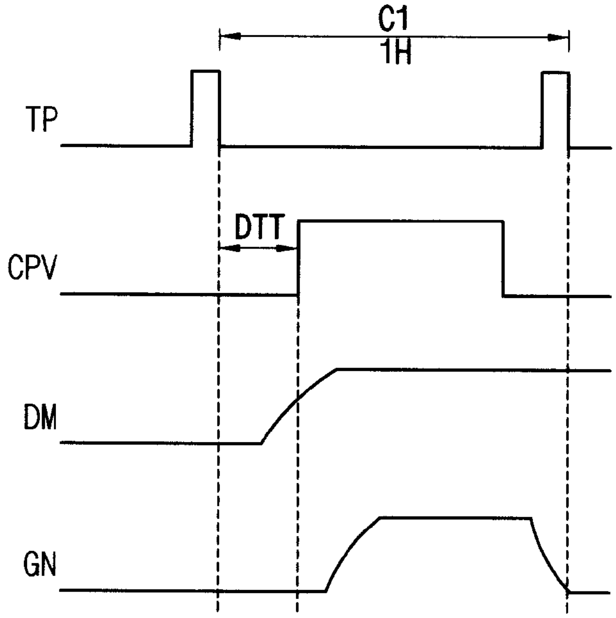
FIG. 6D is a waveform diagram illustrating an exemplary embodiment of driving signals applied to pixel D of FIG. 1.

FIG. 6D is a waveform diagram illustrating an exemplary embodiment of driving signals applied to pixel D of FIG. 1.

Referring to FIG. 1, the pixel A is connected to a first gate line GL1 and a first data line DL1, the pixel B is connected to the first gate line GL1 and a M-th data line DLM, the pixel C is connected to a N-th gate line GLN and the first data line DL1 and the pixel D is connected to the N-th gate line GLN and the M-th data line DLM.

Referring to FIGS. 1 and 6A, a propagation delay of a first data voltage D1 applied to the pixel A is rarely occurred so that a compensation of the first data voltage D1 is not required for the pixel A.

Accordingly, the second data enable signal DE2 corresponding to the first gate line GL1 is substantially the same as the first data enable signal DE1.

Thus, waveforms in FIG. 6A are substantially the same as the waveforms in FIG. 4A, so that any repetitive explanation will be omitted.

Referring to FIGS. 1 and 6B, a propagation delay of a M-th data voltage DM applied to the pixel B is rarely occurred so that a compensation of the M-th data voltage DM is not required for the pixel B.

Accordingly, the second data enable signal DE2 corresponding to the first gate line GL1 is substantially the same as the first data enable signal DE1.

Thus, waveforms in FIG. 6B are substantially the same as the waveforms in FIG. 4B, so that any repetitive explanation will be omitted.

Referring to FIGS. 1 and 6C, a propagation delay of a first data voltage D1 applied to the pixel C is occurred so that a compensation of the first data voltage D1 is required for the pixel C.

The compensation parameter includes information of a compensation gate line among the first to N-th gate lines GL1 to GLN.

The second data enable signal DE2 corresponding to the N-th gate line GLN is delayed for a total delay period DTT with respect to the first data enable signal DE1. The total delay period DTT is a multiplication of the first delay period DT1 delayed for a single compensation gate line and the total number of the compensation gate lines among the first to N-th gate lines.

The gate clock signal CPV corresponding to the N-th gate line is synchronized with the second data enable signal DE2 so that the gate clock signal CPV is delayed corresponding to the N-th gate line is delayed for the total delay period DTT from a falling edge of the load signal TP corresponding to the N-th gate line. In addition, the N-th gate signal GN is synchronized with the gate clock signal CPV, so that the N-th gate signal GN rises after the total delay period DTT from the falling edge of the load signal TP.

Therefore, when a level of the first data voltage D1 increases over a meaningful level, the N-th gate signal rises so that a decrease of a charging rate of the pixel due to the data propagation delay may be compensated.

Referring to FIGS. 1 and 6D, a propagation delay of a M-th data voltage DM applied to the pixel D is occurred so that a compensation of the M-th data voltage DM is required for the pixel D.

The compensation parameter includes information of a compensation gate line among the first to N-th gate lines GL1 to GLN.

The second data enable signal DE2 corresponding to the N-th gate line GLN is delayed for a total delay period DTT with respect to the first data enable signal DE1.

The gate clock signal CPV corresponding to the N-th gate line is synchronized with the second data enable signal DE2 so that the gate clock signal CPV is delayed corresponding to the N-th gate line is delayed for the total delay period DTT from a falling edge of the load signal TP corresponding to the N-th gate line. In addition, the N-th gate signal GN is synchronized with the gate clock signal CPV, so that the N-th gate signal GN rises after the total delay period DTT from the falling edge of the load signal TP.

Therefore, when a level of the M-th data voltage DM increases over a meaningful level, the N-th gate signal rises so that a decrease of a charging rate of the pixel due to the data propagation delay may be compensated.

Figure 7:
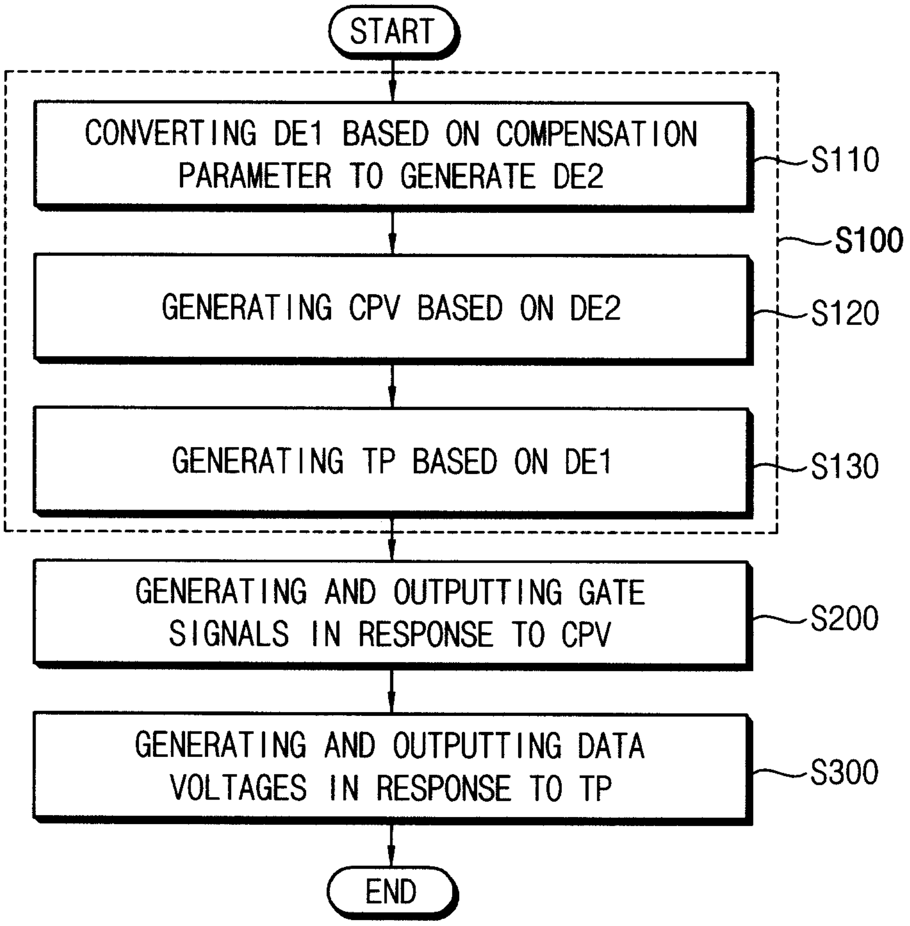
FIG. 7 is a flowchart illustrating an exemplary embodiment of a method of driving a display panel of FIG. 1.

FIG. 7 is a flowchart illustrating an exemplary embodiment of a method of driving a display panel 100 of FIG. 1.

Referring to FIGS. 1, 2 and 7, the timing controller 200 generates the first control signal CONT1, the second control signal CONT2 and the data signal DATA based on the input image data and the input control signal (step S100).

The timing controller 200 includes the data compensator 210, the second data enable signal generator 220 and the control signal generator 230.

The second data enable signal generator 220 converts the first data enable signal DE1 based on the compensation parameter to generate the second data enable signal DE2 (step S110).

The control signal generator 230 generates the gate clock signal CPV synchronized with the second data enable signal DE2 based on the second data enable signal DE2 to output the gate clock signal CPV to the gate driver 300 (step S120).

The control signal generator 230 generates the load signal TP synchronized with the first data enable signal DE1 based on the first data enable signal DE1 to output the load signal TP to the data driver 500 (step S130).

The gate driver 300 generates the gate signals G1 to GN synchronized with the gate clock signal CPV in response to the gate clock signal CPV to output the gate signals G1 to GN to the gate lines GL1 to GLN (step S200).

The data driver 500 generates the data voltages D1 to DM synchronized with the load signal TP in response to the load signal TP to output the data voltages D1 to DM to the data lines DL1 to DLM (step S300).

According to the present exemplary embodiment, a decrease of a charging rate of the pixel due to the data propagation delay may be compensated so that a display quality of the display panel 100 may be improved.

Figure 8:
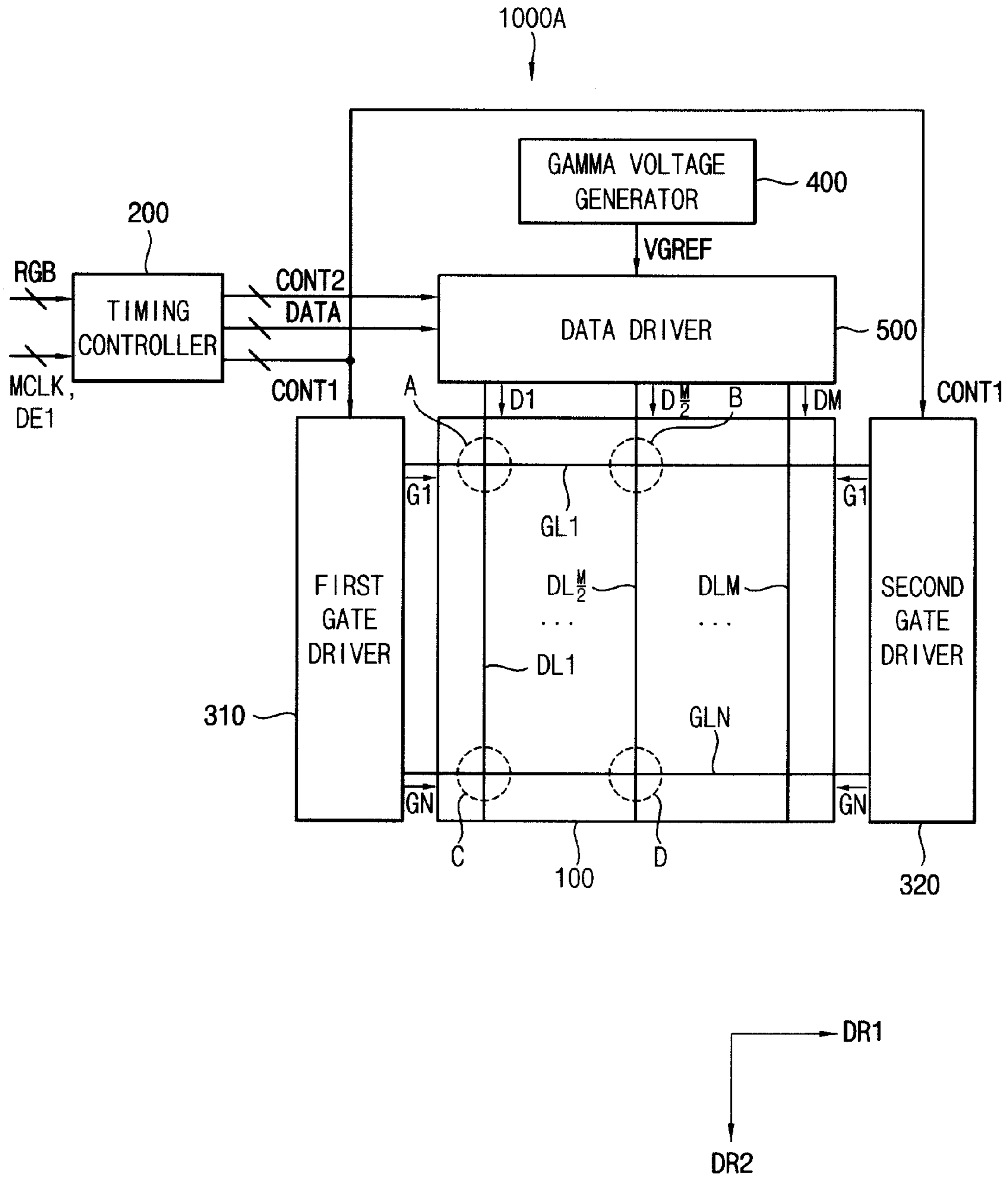
FIG. 8 is a block diagram illustrating another exemplary embodiment of a display apparatus according to the present invention.

FIG. 8 is a block diagram illustrating another exemplary embodiment of a display apparatus 1000A according to the present invention.

The display apparatus 1000A according to the present exemplary embodiment is substantially the same as the display apparatus according to the previous exemplary embodiment of FIG. 1 except the display apparatus 1000A includes first and second gate drivers 310 and 320. Thus, the same reference numerals will be used to refer to the same or like parts as those described in the previous exemplary embodiment of FIG. 1 and any repetitive explanation concerning the above elements will be omitted.

The method of driving the display panel 100 according to the present exemplary embodiment is substantially the same as the method of driving the display panel 100 according to the previous exemplary embodiment of FIG. 1. Thus, the same reference numerals will be used to refer to the same or like parts as those described in the previous exemplary embodiment of FIG. 1 and any repetitive explanation concerning the above elements will be omitted.

Referring to FIG. 8, the display apparatus 1000A includes the display panel 100, the timing controller 200, the first gate driver 310, the second gate driver 320, the gamma voltage generator 400 and the data driver 500.

The display panel 100 includes a plurality of gate lines GL1 to GLN, a plurality of data lines DL1 to DLM and a plurality of pixels electrically connected to the gate lines GL1 to GLN and the data lines DL1 to DLM. Herein N and M are natural numbers. The gate lines GL1 to GLN extend in a first direction DR1 and the data lines DL1 to DLM extend in a second direction DR2 crossing the first direction DR1. Each pixel includes a switching element, a liquid crystal capacitor and a storage capacitor. The liquid crystal capacitor and the storage capacitor are electrically connected to the switching element. The pixels are arranged in a matrix form.

The timing controller 200 receives an input image data RGB and an input control signal MCLK and DE1 from an external apparatus. The input control signal includes a master clock signal MCLK and a first data enable signal DE1.

The timing controller 200 generates a first control signal CONT1, a second control signal CONT2 and a data signal DATA based on the input image data and the input control signal. The timing controller 200 outputs the first control signal CONT1 to first and second gate drivers 310 and 320. The timing controller 200 outputs the second control signal CONT2 to the data driver 500.

The first control signal CONT1 includes a vertical start signal and a gate clock signal. The second control signal CONT2 includes a horizontal start signal and a load signal.

The timing controller 200 includes the data compensator 210, the second data enable signal generator 220 and the control signal generator 230. The second data enable signal generator 220 generates the second data enable signal DE2 based on the master clock signal MCLK, the first data enable signal DE1 and the compensation parameter.

The first gate driver 310 generates gate signals G1 to GN in response to the first control signal CONT1 received from the timing controller 200. The first gate driver 310 outputs the gate signals G1 to GN to first end portions of the gate lines GL1 to GLN.

The second gate driver 320 may be disposed opposite to the first gate driver 310 with respect to the display panel 100. The second gate driver 320 generates gate signals G1 to GN in response to the first control signal CONT1 received from the timing controller 200. The second gate driver 320 outputs the gate signals G1 to GN to second end portions of the gate lines GL1 to GLN opposite to the first end portions.

The gamma voltage generator 400 generates a gamma reference voltage VGREF. The gamma voltage generator 400 provides the gamma reference voltage VGREF to the data driver 500.

The data driver 500 receives the second control signal CONT2 and the data signal DATA from the timing controller 200 and receives the gamma reference voltages VGREF from the gamma voltage generator 400. The data driver 500 converts the data signal DATA into data voltages D1 to DM having an analog type using the gamma reference voltages VGREF. The data driver 500 sequentially outputs the data voltages D1 to DM to the data lines DL1 to DLM.

Figure 9A:
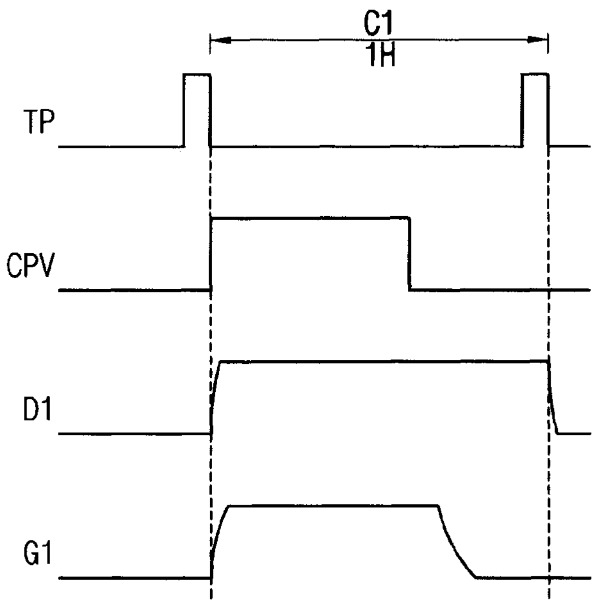
FIG. 9A is a waveform diagram illustrating driving signals applied to pixel A of FIG. 8 in the display apparatus not including the second data enable signal generator.

FIG. 9A is a waveform diagram illustrating driving signals applied to pixel A of FIG. 8 in the display apparatus not including the second data enable signal generator.

Figure 9B:
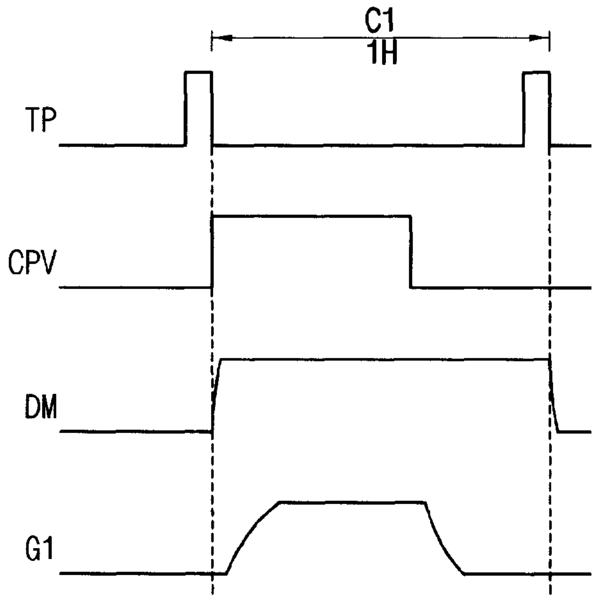
FIG. 9B is a waveform diagram illustrating driving signals applied to pixel B of FIG. 8 in the display apparatus not including the second data enable signal generator.

FIG. 9B is a waveform diagram illustrating driving signals applied to pixel B of FIG. 8 in the display apparatus not including the second data enable signal generator.

Figure 9C:
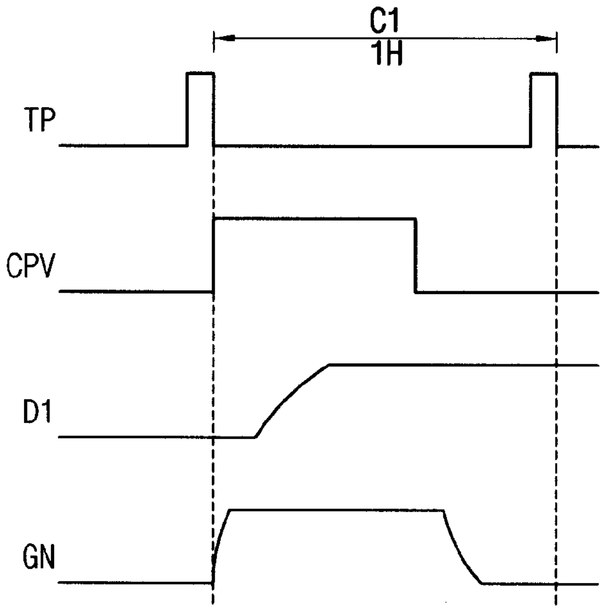
FIG. 9C is a waveform diagram illustrating driving signals applied to pixel C of FIG. 8 in the display apparatus not including the second data enable signal generator.

FIG. 9C is a waveform diagram illustrating driving signals applied to pixel C of FIG. 8 in the display apparatus not including the second data enable signal generator.

Figure 9D:
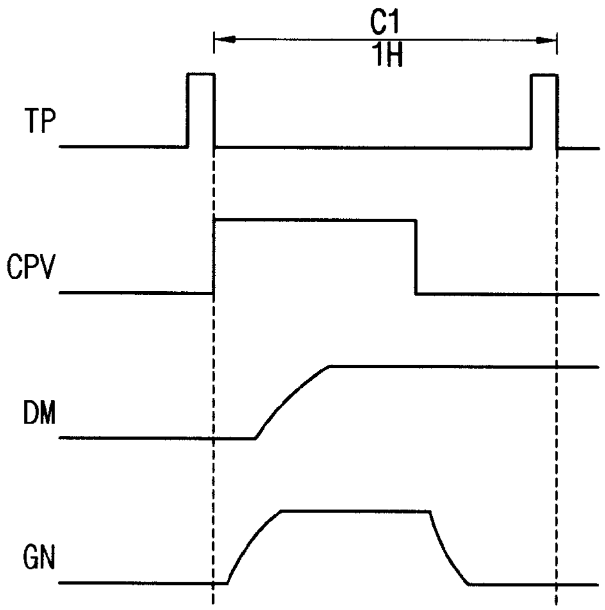
FIG. 9D is a waveform diagram illustrating driving signals applied to pixel D of FIG. 8 in the display apparatus not including the second data enable signal generator.

FIG. 9D is a waveform diagram illustrating driving signals applied to pixel D of FIG. 8 in the display apparatus not including the second data enable signal generator.

Referring to FIG. 8, a pixel A is connected to a first gate line GL1 and a first data line DL1, a pixel B is connected to the first gate line GL1 and a (M/2)-th data line DLM/2, a pixel C is connected to a N-th gate line GLN and the first data line DL1 and a pixel D is connected to the N-th gate line GLN and the (M/2)-th data line DLM/2.

Referring to FIGS. 8 and 9A, a propagation delay of a first gate signal G1 applied to a pixel corresponding to the pixel A through the first gate line GL1 is rarely occurred because a distance between the first gate driver 310 and the pixel is relatively short. In addition, a propagation delay of a first data voltage D1 applied to the pixel corresponding to the pixel A through the first data line DL1 is rarely occurred because a distance between the data driver 500 and the pixel is relatively short.

The first data voltage D1 is synchronized with a first square wave of the load signal TP. The first data voltage D1 rises at a first falling edge of the load signal TP and maintains a high level for a single horizontal cycle 1H.

The first gate signal G1 is synchronized with a first square wave of the gate clock signal CPV. The first gate signal G1 rises at a first rising edge of the gate clock signal CPV and falls at a first falling edge of the gate clock signal CPV.

The first gate signal G1 may be a sum of a gate signal from the first gate driver 310 and a gate signal from the second gate driver 320 so that the first gate signal G1 may maintain a high level longer than the first gate signal G1 in FIG. 4A.

The first gate signal G1 applied to the pixel corresponding to the pixel A is rarely delayed so that a charging period is relatively long. The first data voltage D1 applied to the pixel corresponding to the pixel A is rarely delayed so that a relatively high data voltage is provided to the pixel. As a result, a charging rate of the first data voltage D1 applied to the pixel corresponding to the pixel A is relatively high.

Referring to FIGS. 8 and 9B, a propagation delay of a first gate signal G1 applied to a pixel corresponding to the pixel B through the first gate line GL1 may be occurred because a distance between the first gate driver 310 and the pixel is relatively long. In contrast, a propagation delay of a (M/2)-th data voltage DM/2 applied to the pixel corresponding to the pixel B through the (M/2)-th data line DLM/2 is rarely occurred because a distance between the data driver 500 and the pixel is relatively short.

The (M/2)-th data voltage DM/2 is synchronized with a (M/2)-th square wave of the load signal TP. The (M/2)-th data voltage DM/2 rises at a (M/2)-th falling edge of the load signal TP and maintains a high level for a single horizontal cycle 1H.

The first gate signal G1 is synchronized with a first square wave of the gate clock signal CPV. The first gate signal G1 rises at a first rising edge of the gate clock signal CPV and falls at a first falling edge of the gate clock signal CPV.

The first gate signal G1 may be a sum of a gate signal from the first gate driver 310 and a gate signal from the second gate driver 320. However, a distance between the first gate driver 310 and the pixel is substantially the same as a distance between the second gate driver 320 and the pixel so that a high period of the first gate signal G1 may be rarely extended comparing the first gate signal G1 in FIG. 4B. Thus, the first gate signal G1 may be delayed.

The first gate signal G1 applied to the pixel corresponding to the pixel B is delayed so that a turn-on period of the switching element of the pixel is decreased. Thus, a charging period of the pixel may be decreased. In contrast, the (M/2)-th data voltage DM/2 applied to the pixel corresponding to the pixel B is rarely delayed so that a relatively high data voltage is provided to the pixel. As a result, a charging rate of the (M/2)-th data voltage DM/2 applied to the pixel corresponding to the pixel B may be lower than the charging rate of the first data voltage D1 applied to the pixel corresponding to the pixel A.

Referring to FIGS. 8 and 9C, a propagation delay of a N-th first gate signal GN applied to a pixel corresponding to the pixel C through the N-th gate line GLN is rarely occurred because a distance between the first gate driver 310 and the pixel is relatively short. In contrast, a propagation delay of a first data voltage D1 applied to the pixel corresponding to the pixel C may be occurred because a distance between the data driver 500 and the pixel is relatively long.

The first data voltage D1 is synchronized with a first square wave of the load signal TP. The first data voltage D1 rises at a first falling edge of the load signal TP, and maintains a high level for a single horizontal cycle 1H. The first data voltage D1 may be delayed.

The N-th gate signal GN is synchronized with a N-th square wave of the gate clock signal CPV. The N-th gate signal GN rises at a N-th rising edge of the gate clock signal CPV and falls at a N-th falling edge of the gate clock signal CPV.

The N-th gate signal GN may be a sum of a gate signal from the first gate driver 310 and a gate signal from the second gate driver 320 so that the N-th gate signal GN may maintain a high level longer than the N-th gate signal GN in FIG. 4C.

The n-th gate signal GN applied to the pixel corresponding to the pixel C is rarely delayed so that a charging period is relatively long. In contrast, the first data voltage D1 applied to the pixel corresponding to the pixel C is delayed so that a relatively low data voltage is provided to the pixel. As a result, a charging rate of the first data voltage D1 applied to the pixel corresponding to the pixel C may be lower than the charging rate of the first data voltage D1 applied to the pixel corresponding to the pixel A.

Referring to FIGS. 8 and 9D, a propagation delay of a N-th first gate signal GN applied to a pixel corresponding to the pixel D through the N-th gate line GLN is occurred because a distance between the first gate driver 310 and the pixel is relatively long. In addition, a propagation delay of a (M/2)-th data voltage DM/2 applied to the pixel corresponding to the pixel D may be occurred because a distance between the data driver 500 and the pixel is relatively long.

The (M/2)-th data voltage DM/2 is synchronized with a first square wave of the load signal TP. The (M/2)-th data voltage DM/2 rises at a first falling edge of the load signal TP, and maintains a high level for a single horizontal cycle 1H. The (M/2)-th data voltage DM/2 may be delayed.

The N-th gate signal GN may be a sum of a gate signal from the first gate driver 310 and a gate signal from the second gate driver 320. However, a distance between the first gate driver 310 and the pixel is substantially the same as a distance between the second gate driver 320 and the pixel so that a high period of the N-th gate signal GN may be rarely extended comparing the N-th gate signal GN in FIG. 4D. Thus, the N-th gate signal GN may be delayed.

The n-th gate signal GN applied to the pixel corresponding to the pixel D is delayed so that a turn-on period of the switching element of the pixel is decreased. Thus, a charging period of the pixel may be decreased. In addition, the (M/2)-th data voltage DM/2 applied to the pixel corresponding to the pixel D is delayed so that a relatively low data voltage is provided to the pixel. As a result, a charging rate of the (M/2)-th data voltage DM/2 applied to the pixel corresponding to the pixel D may be lower than the charging rate of the (M/2)-th data voltage DM/2 applied to the pixel corresponding to the pixel B.

In FIGS. 9B and 9D, the charging rate of the pixel may be decreased due to a gate propagation delay and in FIGS. 9C and 9D, the charging rate of the pixel may be decreased due to a data propagation delay. However, in the present exemplary embodiment, the display apparatus 1000A includes the first and second gate drivers 310 and 320 so that the gate signals G1 to GN are applied to the pixels from both sides of the gate lines GL1 to GLN. Accordingly, the gate propagation delay may be decreased in FIGS. 9B and 9D comparing to the gate propagation delay in FIGS. 4B and 4D. Thus, the data propagation delay compensation may be required.

Figure 10A:
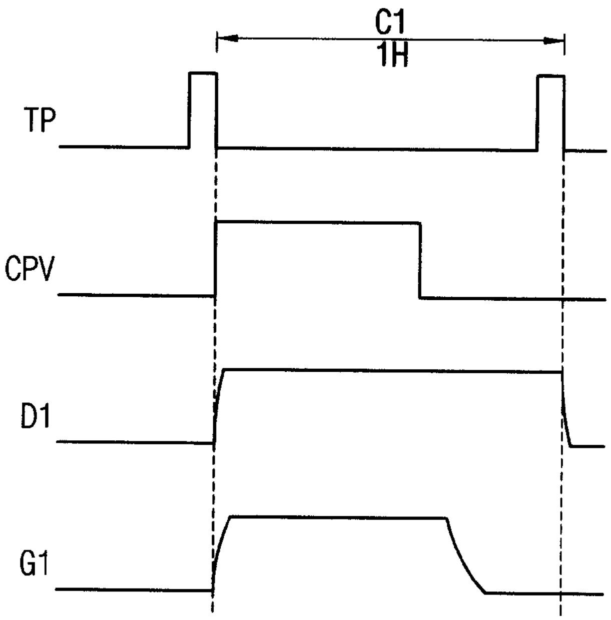
FIG. 10A is a waveform diagram illustrating another exemplary embodiment of driving signals applied to pixel A of FIG. 8.

FIG. 10A is a waveform diagram illustrating another exemplary embodiment of driving signals applied to pixel A of FIG. 8.

Figure 10B:
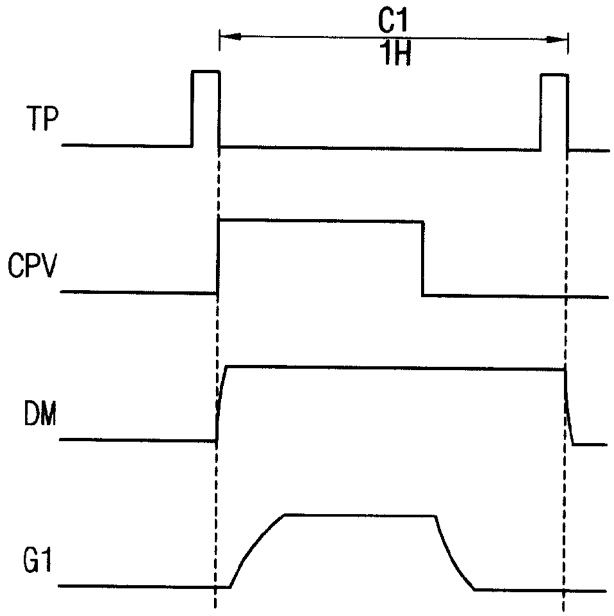
FIG. 10B is a waveform diagram illustrating another exemplary embodiment of driving signals applied to pixel B of FIG. 8.

FIG. 10B is a waveform diagram illustrating another exemplary embodiment of driving signals applied to pixel B of FIG. 8.

Figure 10C:
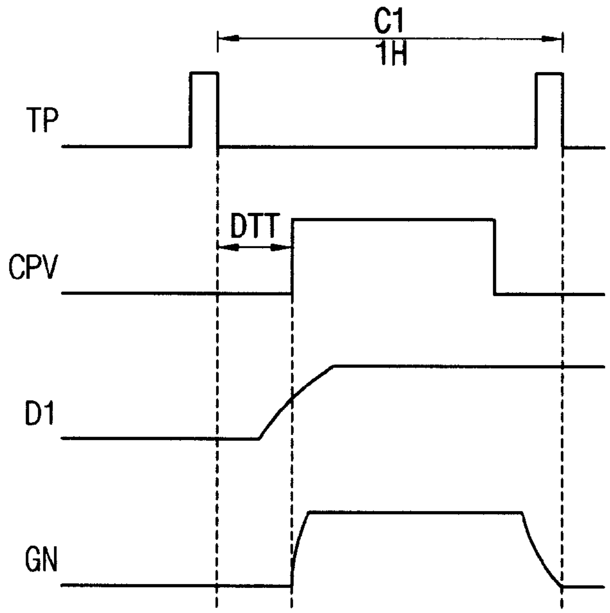
FIG. 10C is a waveform diagram illustrating another exemplary embodiment of driving signals applied to pixel C of FIG. 8.

FIG. 10C is a waveform diagram illustrating another exemplary embodiment of driving signals applied to pixel C of FIG. 8.

Figure 10D:
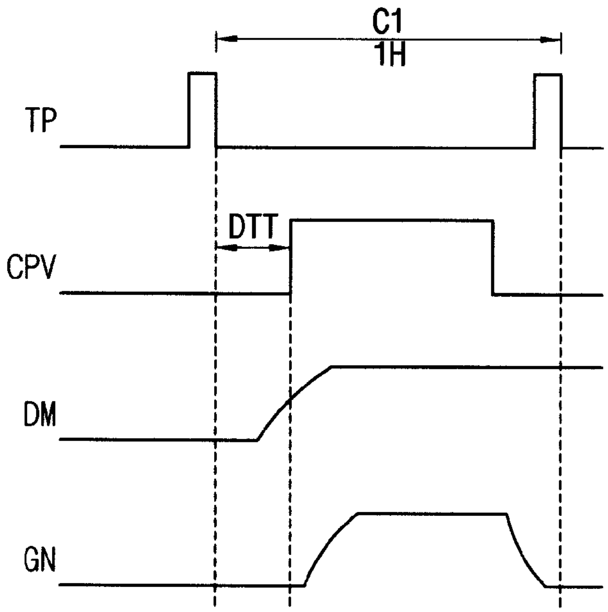
FIG. 10D is a waveform diagram illustrating another exemplary embodiment of driving signals applied to pixel D of FIG. 8.

FIG. 10D is a waveform diagram illustrating another exemplary embodiment of driving signals applied to pixel D of FIG. 8.

Referring to FIGS. 8 and 10A, a propagation delay of a first data voltage D1 applied to the pixel A is rarely occurred so that a compensation of the first data voltage D1 is not required for the pixel A.

Accordingly, the second data enable signal DE2 corresponding to the first gate line GL1 is substantially the same as the first data enable signal DE1.

Thus, waveforms in FIG. 10A are substantially the same as the waveforms in FIG. 9A, so that any repetitive explanation will be omitted.

Referring to FIGS. 8 and 10B, a propagation delay of a (M/2)-th data voltage DM/2 applied to the pixel B is rarely occurred so that a compensation of the (M/2)-th data voltage DM/2 is not required for the pixel B.

Accordingly, the second data enable signal DE2 corresponding to the first gate line GL1 is substantially the same as the first data enable signal DE1.

Thus, waveforms in FIG. 10B are substantially the same as the waveforms in FIG. 9B, so that any repetitive explanation will be omitted.

Referring to FIGS. 8 and 10C, a propagation delay of a first data voltage D1 applied to the pixel C is occurred so that a compensation of the first data voltage D1 is required for the pixel C.

The compensation parameter includes information of a compensation gate line among the first to N-th gate lines GL1 to GLN.

The second data enable signal DE2 corresponding to the N-th gate line GLN is delayed for a total delay period DTT with respect to the first data enable signal DE1.

The gate clock signal CPV corresponding to the N-th gate line is synchronized with the second data enable signal DE2 so that the gate clock signal CPV is delayed corresponding to the N-th gate line is delayed for the total delay period DTT from a falling edge of the load signal TP corresponding to the N-th gate line. In addition, the N-th gate signal GN is synchronized with the gate clock signal CPV, so that the N-th gate signal GN rises after the total delay period DTT from the falling edge of the load signal TP.

Therefore, when a level of the first data voltage D1 increases over a meaningful level, the N-th gate signal rises so that a decrease of a charging rate of the pixel due to the data propagation delay may be compensated.

Referring to FIGS. 8 and 10D, a propagation delay of a (M/2)-th data voltage DM/2 applied to the pixel D is occurred so that a compensation of the (M/2)-th data voltage DM/2 is required for the pixel D.

The compensation parameter includes information of a compensation gate line among the first to N-th gate lines GL1 to GLN.

The second data enable signal DE2 corresponding to the N-th gate line GLN is delayed for a total delay period DTT with respect to the first data enable signal DE1.

The gate clock signal CPV corresponding to the N-th gate line is synchronized with the second data enable signal DE2 so that the gate clock signal CPV is delayed corresponding to the N-th gate line is delayed for the total delay period DTT from a falling edge of the load signal TP corresponding to the N-th gate line. In addition, the N-th gate signal GN is synchronized with the gate clock signal CPV, so that the N-th gate signal GN rises after the total delay period DTT from the falling edge of the load signal TP.

Therefore, when a level of the (M/2)-th data voltage DM/2 increases over a meaningful level, the N-th gate signal rises so that a decrease of a charging rate of the pixel due to the data propagation delay may be compensated.

According to the present exemplary embodiment, a decrease of a charging rate of the pixel due to the data propagation delay may be compensated so that a display quality of the display panel 100 may be improved.

In addition, a decrease of a charging rate of the pixel due to the gate propagation delay may be compensated using a dual gate driving method so that a display quality of the display panel 100 may be further improved.

As explained above, according to the present invention, a propagation delay of a data voltage is compensated so that a charging rate of a pixel may be increased. Thus, a display quality of a display panel may be improved.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A method of driving a display panel, the method comprising:
- converting a first data enable signal including a first cycle based on a compensation parameter to generate a second data enable signal including a second cycle longer than the first cycle;
- generating a plurality of gate signals based on the second data enable signal to output the gate signals to a plurality of gate lines of the display panel; and
- generating a plurality of data voltages based on the first data enable signal to output the data voltages to a plurality of data lines of the display panel.

2. The method of claim 1, wherein
- the compensation parameter includes information identifying a compensation gate line which is required to be compensated among the gate lines, and
- the second data enable signal includes the first cycle corresponding to the gate lines except for the compensation gate line, and the second cycle corresponding to the compensation gate line.

3. The method of claim 2, wherein
- the first and second data enable signals each respectively have a high period and a low period, and
- the low period of the second data enable signal corresponding to the compensation gate line is longer than the low period of the first data enable signal corresponding to the compensation gate line.

4. The method of claim 3, wherein the low period of the second data enable signal corresponding to the compensation gate line is longer than the low period of the first data enable signal corresponding to the compensation gate line by one master clock.

5. The method of claim 3, wherein the high period of the second data enable signal is substantially the same as the high period of the first data enable signal.

6. The method of claim 1, wherein the generating a plurality of gate signals comprises:
- generating a gate clock signal synchronized with the second data enable signal; and
- generating and outputting the gate signals using the gate clock signal.

7. The method of claim 6, wherein the gate clock signal rises after a first period from a rising edge of the second data enable signal, and falls after a second period from the rising edge of the second data enable signal.

8. The method of claim 6, wherein the generating a plurality of data voltages comprises:
- generating a load signal synchronized with the first data enable signal; and
- generating and outputting the data voltages in response to the load signal.

9. The method of claim 8, wherein the load signal rises after a first period from a rising edge of the second data enable signal, and falls after a second period from the rising edge of the second data enable signal.

10. The method of claim 9, wherein the data voltages are synchronized with the load signal.

11. The method of claim 8, wherein a falling edge of the load signal is substantially the same as a rising edge of the gate clock signal.

12. A display apparatus comprising:
- a display panel including a plurality of gate lines and a plurality of data lines;
- a timing controller converting a first data enable signal including a first cycle based on a compensation parameter to generate a second data enable signal including a second cycle longer than the first cycle, and generating a first control signal based on the second data enable signal and a second control signal based on the first data enable signal;
- a first gate driver generating a plurality of first gate signals based on the first control signal to respectively output the first gate signals to the gate lines; and
- a data driver generating a plurality of data voltages based on the second control signal to respectively output the data voltages to the data lines.

13. The display apparatus of claim 12, wherein
- the compensation parameter includes information identifying a compensation gate line which is required to be compensated among the gate lines, and
- the second data enable signal includes the first cycle corresponding to the gate lines except for the compensation gate line and the second cycle corresponding to the compensation gate line.

14. The display apparatus of claim 13, wherein the first and second data enable signals each respectively have a high period and a low period, and
- the low period of the second data enable signal corresponding to the compensation gate line is longer than the low period of the first data enable signal corresponding to the compensation gate line.

15. The display apparatus of claim 14, wherein the low period of the second data enable signal corresponding to the compensation gate line is longer than the low period of the first data enable signal corresponding to the compensation gate line by one master clock.

16. The display apparatus of claim 14, wherein the high period of the second data enable signal is substantially the same as the high period of the first data enable signal.

17. The display apparatus of claim 12, wherein the first control signal includes a gate clock signal synchronized with the second data enable signal.

18. The display apparatus of claim 17, wherein the second control signal includes a load signal synchronized with the first data enable signal.

19. The display apparatus of claim 18, wherein a falling edge of the load signal is substantially the same as a rising edge of the gate clock signal.

20. The display apparatus of claim 12, further comprising a second gate driver generating a plurality of second gate signals based on the first control signals to respectively output the second gate signals to the gate lines, wherein the second gate driver is disposed on a side opposite to the first gate driver with respect to the display panel.

* * * * *